United States Patent
Grimaldo et al.

(10) Patent No.: US 9,873,314 B1
(45) Date of Patent: Jan. 23, 2018

(54) SUNROOF WIND DEFLECTOR SYSTEM

(71) Applicant: AISIN TECHNICAL CENTER OF AMERICA, INC., Northville, MI (US)

(72) Inventors: Jacob Grimaldo, Garden City, MI (US); Ryan Heins, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 15/333,756

(22) Filed: Oct. 25, 2016

(51) Int. Cl.
*B60J 7/22* (2006.01)
*B60J 7/043* (2006.01)

(52) U.S. Cl.
CPC ...... *B60J 7/22* (2013.01); *B60J 7/043* (2013.01)

(58) Field of Classification Search
CPC ............................................. B60J 7/22
USPC ....................................... 296/217
See application file for complete search history.

(56) References Cited

U.S. PATENT DOCUMENTS

| | | | | |
|---|---|---|---|---|
| 4,676,546 A | * | 6/1987 | Igel | B60J 7/22 296/217 |
| 8,267,465 B2 | * | 9/2012 | Wetzels | B60J 7/22 296/180.1 |
| 8,403,406 B2 | * | 3/2013 | Fukami | B60J 7/22 296/217 |

FOREIGN PATENT DOCUMENTS

| | | |
|---|---|---|
| JP | 2016-11036 A | 1/2016 |
| JP | 2016-11037 A | 1/2016 |

* cited by examiner

*Primary Examiner* — Dennis H Pedder
(74) *Attorney, Agent, or Firm* — Oblon, McClelland, Maier & Neustadt, L.L.P.

(57) ABSTRACT

A system to reduce wind noise and turbulent airflow from entering into a sunroof opening of a vehicle, including a sunroof panel slideably connected to the sunroof opening; a rail on a side of the sunroof opening; and a holder fixed in the rail; a deflector assembly including an upper panel pivotally connected to holder and a lower panel connected to the rail. The sunroof panel covers and compresses the deflector assembly in a closed position and covers the sunroof opening, and the deflector assembly rotates and extends when the sunroof panel retracts to an at least a partially open position.

7 Claims, 6 Drawing Sheets

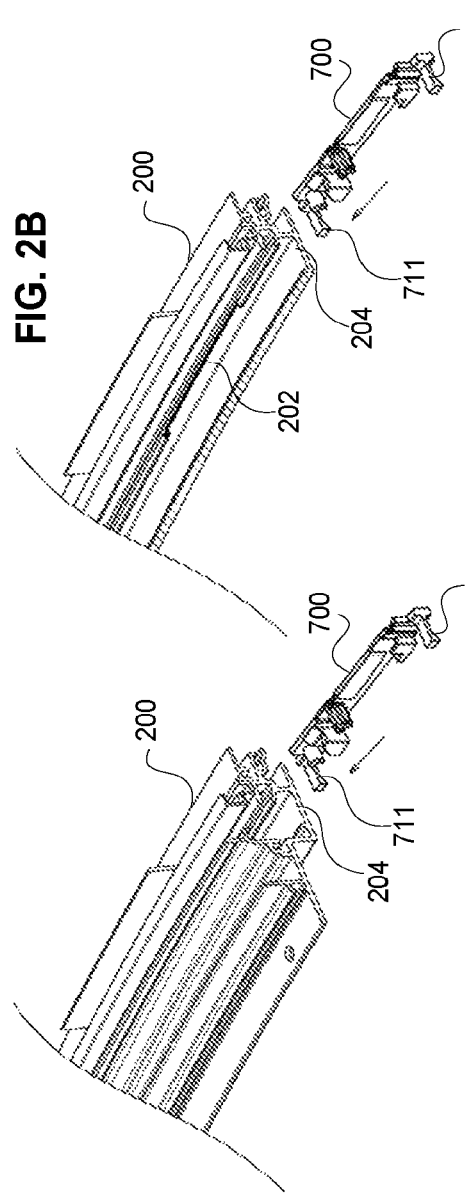
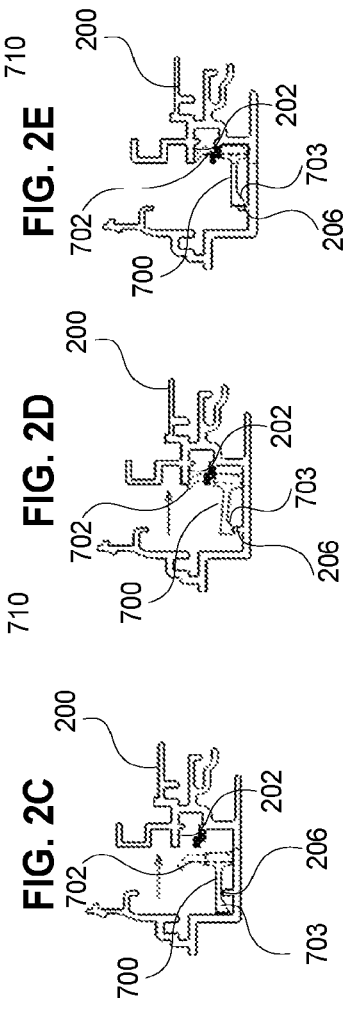
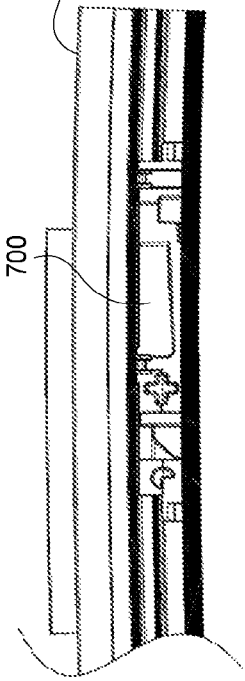
FIG. 2A
FIG. 2B
FIG. 2C
FIG. 2D
FIG. 2E
FIG. 2F

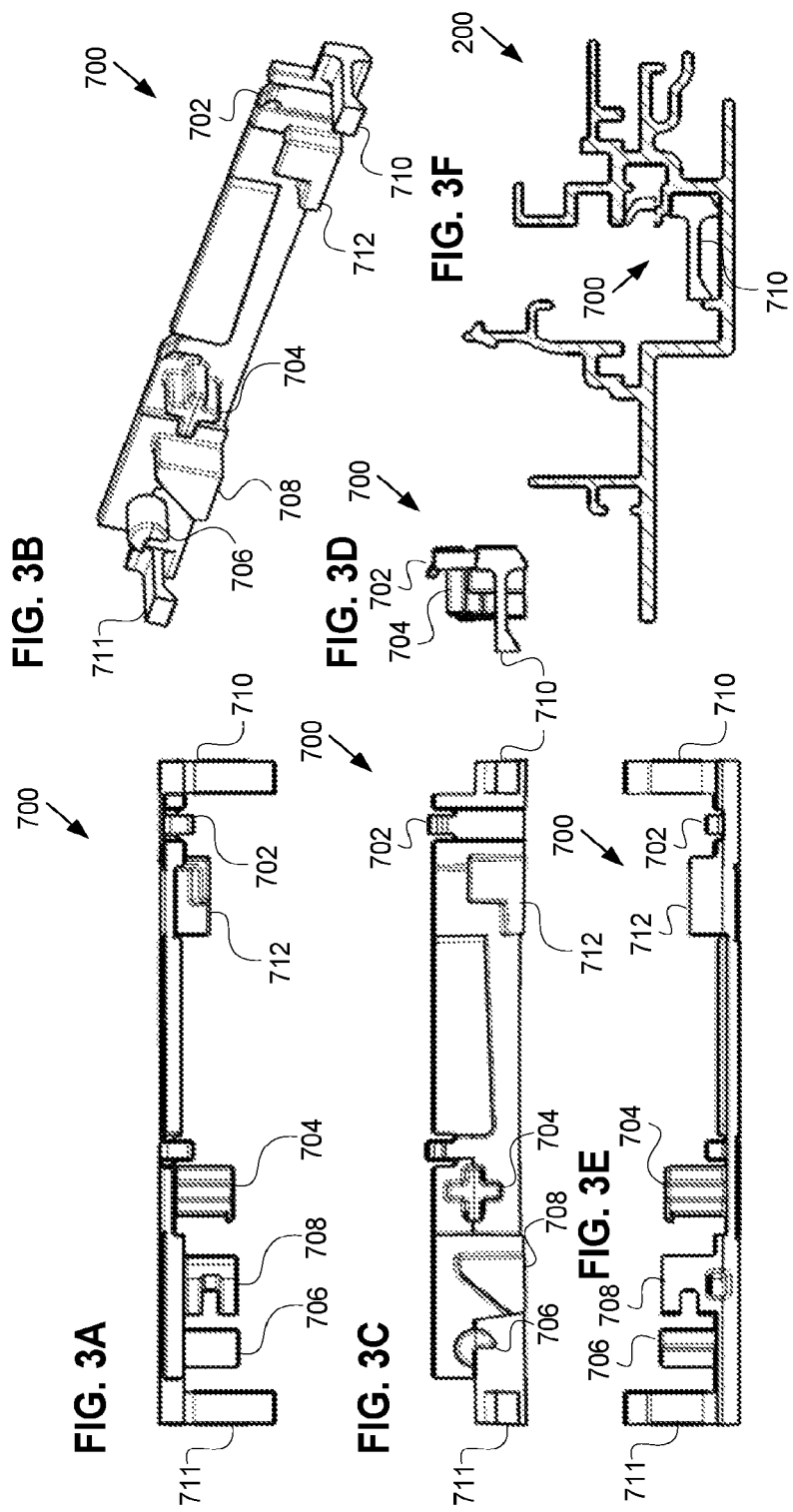

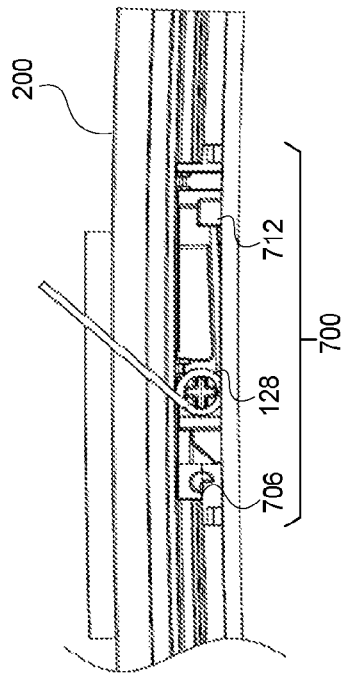
FIG. 6A
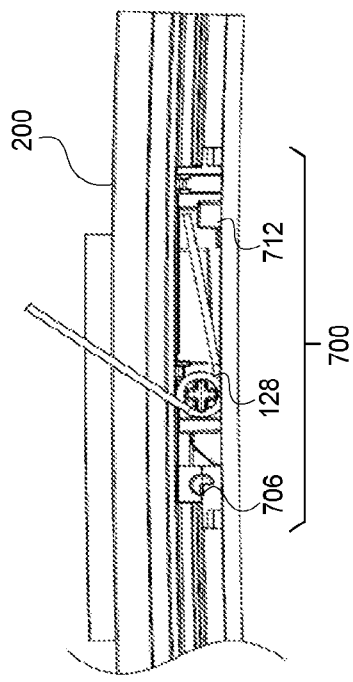
FIG. 6B
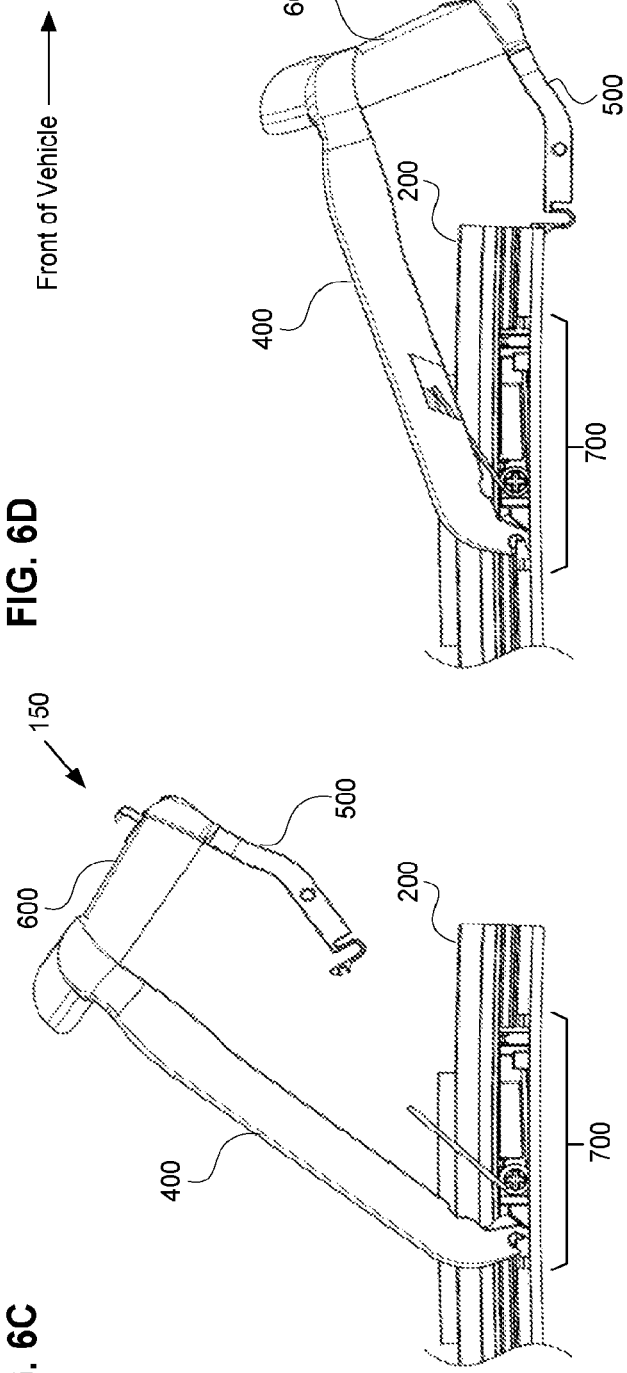
FIG. 6C
FIG. 6D

SUNROOF WIND DEFLECTOR SYSTEM

BACKGROUND

Field of the Disclosure

The present disclosure is directed toward a compressible and extendable sunroof wind deflector system and method.

Description of the Related Art

As vehicle sunroofs encompass increasingly large areas, a number of challenges are growing in prominence. A sunroof tends to add mass to a vehicle and reduce an amount of available interior volume, particularly passenger headroom, due to the space requirements of the associated mechanisms needed for operating the sunroof. Use of an open sunroof also tends to increase vehicle aerodynamic drag and creates wind noise in the passenger compartment of the vehicle. Aerodynamic drag also has the undesirable effect of reducing vehicle fuel efficiency. For these reasons it is important that improved systems and methods for operation of sunroofs and sunroof mechanisms continue to be developed with the aim of reducing the aforementioned disadvantages.

SUMMARY

The present disclosure is directed to a system for deflecting airflow over and diffusing air before entering a vehicle sunroof opening. The system includes a vehicle having a sunroof opening, a sunroof panel slideably connected to the sunroof opening, and a first and a second rail. The first rail is disposed on a first side of the sunroof opening approximately parallel to a longitudinal axis of the vehicle, and the second rail is disposed on a second, opposite side of the sunroof opening approximately symmetrical and parallel with the first rail. A first and a second holder are each connected to the first rail and the second rail, respectively. A deflector assembly is connected to at least one of the first and second holder, and the first and second rail. In a case where the sunroof panel is in a closed position, it covers the sunroof opening and compresses the deflector assembly. In a case the sunroof panel is in at least a partially open position, the deflector assembly is allowed to extend and direct airflow over and to diffuse air before entering the sunroof opening, preventing high pressure air from entering the vehicle interior.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIGS. 2A-2F illustrate various views of a rail, according to one example;

FIGS. 3A-3F illustrate various views of a holder, according to one example;

FIGS. 6A-6D illustrate an assembly process of the sunroof wind deflector system, according to one example.

DETAILED DESCRIPTION OF THE EMBODIMENTS

Figure 1:
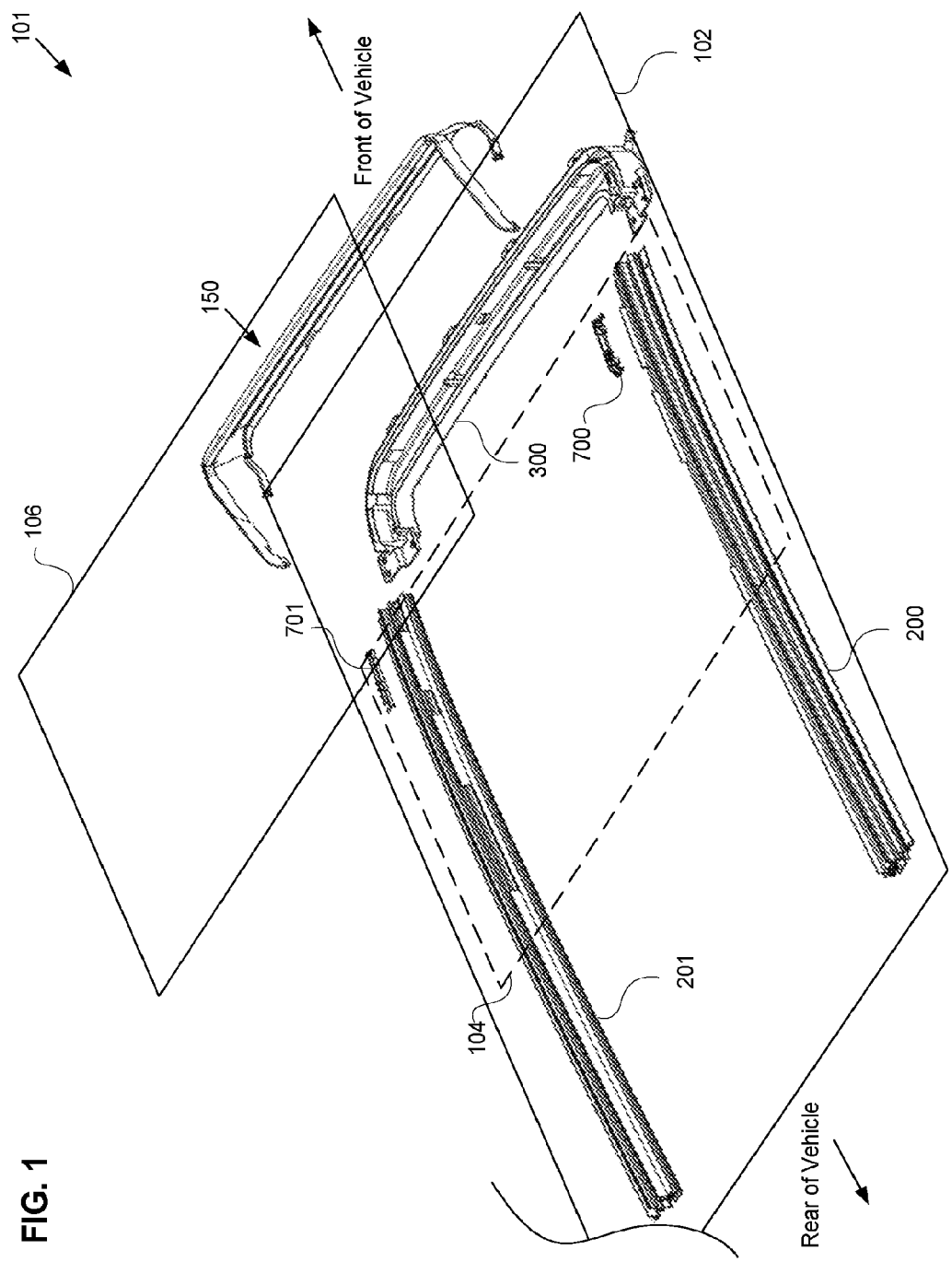
FIG. 1 is a diagram of a sunroof wind deflector system of a vehicle, according to one example.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

FIG. 1 is a diagram of a sunroof wind deflector system 101 of a vehicle 102, according to one example. The sunroof wind deflector system 101 may include a first holder 700 and a second holder 701 connected to a first rail 200 and a second rail 201, respectively, a front housing 300, and a deflector assembly 150. The first rail 200 may be positioned on a first side of a sunroof opening 104 of the vehicle 102, the second rail 201 may be positioned on a second side of the sunroof opening 104, and the pair of rails 200, 201 may be positioned approximately symmetrically relative to the vehicle 102, the first rail 200 and the second rail 201 located on either side of the sunroof opening 104. The front housing 300 may be located near an edge of the sunroof opening 104 located toward a front end of the vehicle 102, and connected to the vehicle 102. The deflector assembly 150 may be connected to at least one of the first rail 200 and the second rail 201, the first holder 700 and the second holder 701, and the front housing 300, and positioned near an edge of the sunroof opening 104.

In a closed state, a sunroof panel 106 may cover the sunroof opening 104 and the sunroof wind deflector system 101, keeping the deflector assembly 150 in a compressed position below the sunroof panel 106.

In an open state, the sunroof panel 106 may be retracted to at least partially open the sunroof opening 104 to expose an interior compartment of the vehicle 102 to an outside environment, and allow the deflector assembly 150 to rise up as the sunroof panel 106 is retracted in a rearward direction beyond a point where the deflector assembly 150 is located.

FIGS. 2A-2F illustrate various views of the rail 200, according to one example. The rail 200 may be connected underneath a roof surface of the vehicle 102 (FIG. 1), with a first end located toward the front of the vehicle 102, the rail 200 adjacent to a first longitudinal edge of the sunroof opening 104. The second rail 201 may be symmetrical to and parallel with the first rail 200, and located adjacent to a second longitudinal edge of the sunroof opening 104. FIG. 2A illustrates one example of the rail 200. The holder 700 may be connected to the rail 200 during assembly through insertion of the holder 700 into a channel 204 located along a length of the rail 200. FIG. 2B illustrates another example of the rail 200. The holder 700 may be connected to the rail 200 during assembly through insertion of the holder 700 into a channel 204 located along a length of the rail 200, though the overall cross-sectional shape of the rail 200 of FIG. 2B may differ from that of FIG. 2A, the cross sectional shape of the channel 204 may have identical dimensions in both FIGS. 2A and 2B to accommodate the holder 700 in each case. In both FIGS. 2A and 2B, the rail 200 may include a channel 204 in its cross section, and a notched portion 202 along its length. The rail 200 also includes a projection 206 that extends upward from an interior portion of the channel 204.

A process for connecting the holder 700 to the channel 204 of the rail 200 is illustrated by the section views of FIGS. 2C-2E. The holder 700 may be inserted along a longitudinal axis of the rail 200 along a length of the channel 204. The holder 700 (FIGS. 2A, 2B) may slide along the length of the rail 200, the holder 700 partially located in the channel 204, until the holder 700 is aligned with the notched portion 202 of the rail 200. The holder 700 may then be pressed against the rail 200 such that at least one of a leg 710 and a leg 711 of the holder 700 are fully connected to and positioned against the projection 206 within the channel 204. As evident by FIG. 2D, a chamfered inner edge 703 of the holder 700 slides over the project 206 and a distal edge of the holder 700 is then held by the projection 206 as shown in FIG. 2E. A tab 702 of the holder 700 is also pressed into the notched portion 202 of the rail 200 by an interference fit such that the holder 700 is then secured from relative movement to the rail 200. The holder 700 may be secured to the rail 200 by placement of the holder 700 into the channel 204 and the notched portion 202, and by compression of the tab 702 via an interference fit with the rail 200. The holder 700 may thus be prevented from vibrating or rattling relative to the vehicle 102, the rail 200, and the sunroof panel 106. The holder 701 may be secured to the rail 201 in a substantially similar way.

Figure 4:
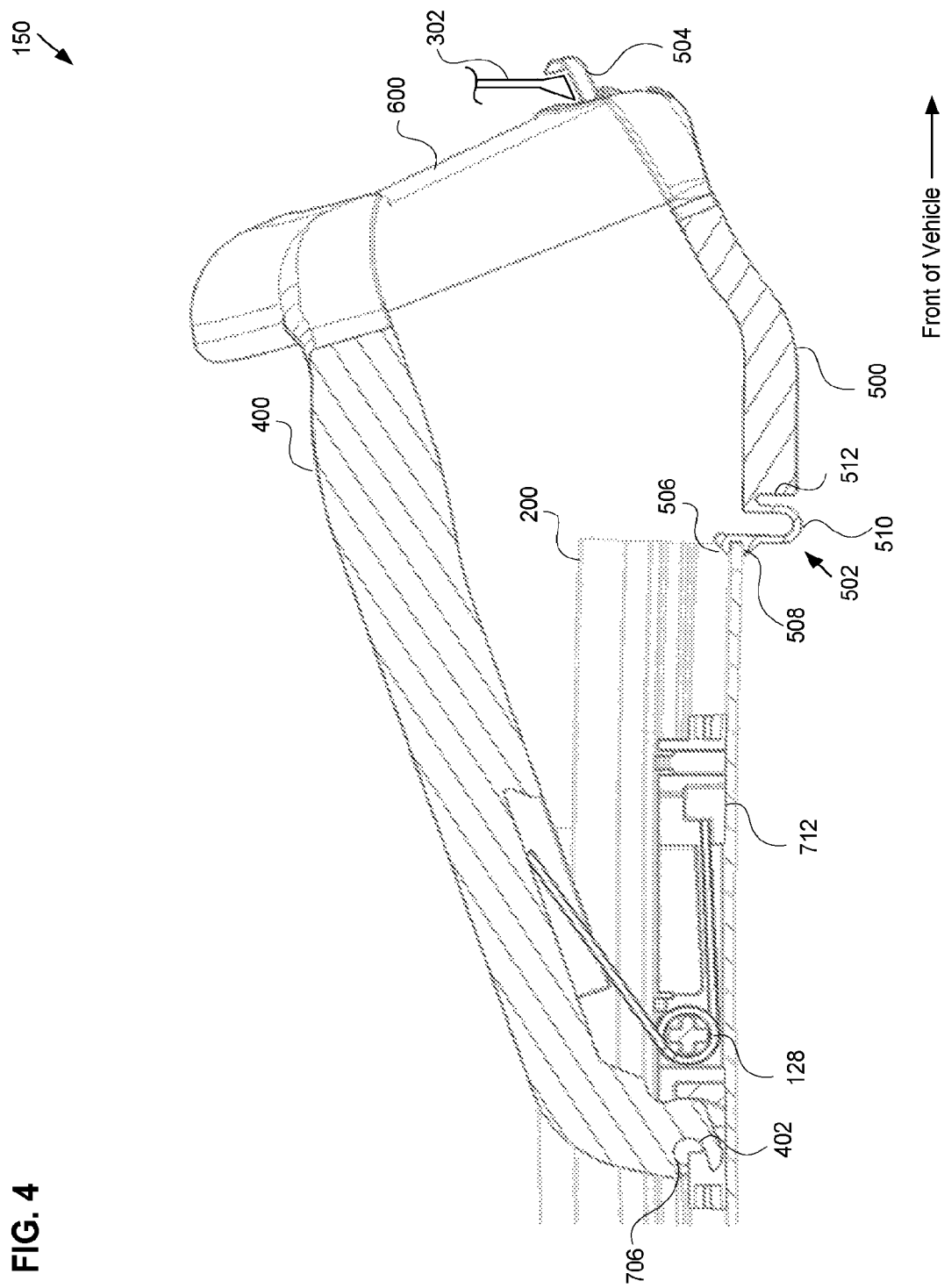
FIG. 4 illustrates a side view of the deflector assembly, according to one example.

Further, at least one of the front end of the first rail 200 and the front end of the second rail 201 may provide a surface to which a lower panel 500 may connect via a mounting arm 502 (FIG. 4). FIG. 2F illustrates a side view of a completed assembly of the holder 700 and the rail 200 according to FIGS. 2C-2E.

An advantage of a compact, nested connection between the holder 700 and the rail 200 is that space is still available for other sunroof components to be connected to and move along the rail 200.

FIGS. 3A-3F illustrate various views of the holder 700, according to one example. The holder 700 may be positioned alongside or within, and connected to, the rail 200 as shown by FIGS. 2A-2F. The holder 700 may further include an upper panel mount 706 and an upper panel stop 708. An upper panel 400 may be rotatably connected to the holder 700 and a first end of the upper panel 400 may rotate about the upper panel mount 706 while the upper panel stop 708 restricts movement of the upper panel 400 to keep the first end of the upper panel 400 connected to the upper panel mount 706 as the upper panel 400 rotates through its operating range of motion (FIG. 4). An arbor 704 may project orthogonally from a longitudinal axis of the holder 700. The arbor 704 may be connected to and support a coil portion of a torsion spring 128 (FIGS. 5A-5D). A first end of the torsion spring 128 may connect to the holder 700 at a spring channel 712, the spring channel 712 retaining the front end of the torsion spring 128 and securing to the holder 700. A second end of the torsion spring 128 may connect to the upper panel 400. As the holder 700 is connected to the channel 204, the tab 702 may be forced into the notched portion 202 of the rail 200. The tab 702 may bend to fit as a height of notched portion 202 may be less than a height of tab 702, creating an interference fit between the notched portion 202 and the tab 702. The purpose of the leg 710 and the channel 204 is to laterally secure the holder 700 to the rail 200. As the holder 700 is positioned along the rail 200 during assembly, the holder 700 may be laterally secured by being pushed into the channel 204 which forces the tab 702 into the notched portion 202. The leg 711 may interact with and connect to the channel 204 the same way as the leg 710 does. The second holder 701 may be connected to the second rail 201, and both the second rail 201 and the second holder 701 may be symmetrical to the first rail 200 and the first holder 700, respectively. FIG. 3F illustrates the holder 700 connected to the rail 200, similar to that illustrated by FIG. 2E.

FIG. 4 illustrates a side view of the deflector assembly 150, according to one example. The description that follows describes one portion of the upper panel 400, and the upper panel 400 may possess a matching second portion that is substantially symmetrical to the first portion. Both portions are illustrated by FIGS. 1 and 5B. The first end of the upper panel 400 may include a mount cutout 402 shaped to connect to the upper panel mount 706. A downward facing side of the upper panel 400 may be in contact with a second end of the torsion spring 128. As the upper panel 400 rotates through its range of motion from a state where the sunroof panel 106 and the upper panel 400 are in a closed position to a state where the sunroof panel 106 is in an at least partially open position, the second end of the torsion spring 128 may push and extend the upper panel 400 to a position above a roof surface of the vehicle 102, and the upper panel 400 is then in an extended position protruding above a height of the sunroof panel 106. As the upper panel 400 extends and retracts, the second end of the torsion spring 128 may slide along the downward facing side of the upper panel 400 to maintain a spring force against the upper panel 400. In an extended position, the upper panel 400 may also pull the mesh 600 in an upward direction to provide a surface by which to direct airflow. The torsion spring 128 may pivot about the arbor 704 and maintain spring tension between the holder 700 and the upper panel 400, providing force to extend the upper panel 400 in an upward direction in a case the sunroof panel 106 is retracted and not resting above the upper panel 400. In a case the sunroof panel 106 is not sufficiently retracted toward the rear of the vehicle 102, the torsion spring 128 remains compressed by the upper panel 400 due to the pressure of the sunroof panel 106 on the upper panel 400, and the upper panel 400 remains in a folded position. A spring force of the torsion spring 128, or a combined spring force of a number of torsion spring 128, applied against the upper panel 400 may be sufficient to prevent vibrational movement of the upper panel 400 up to about 4.4 G of induced vibration.

As the vehicle 102 travels in a forward direction with the sunroof panel 106 in an open or partially open position and the upper panel 400 is in an extended position, the mesh 600 may be stretched to a tautness such that the mesh 600 directs airflow over the sunroof opening 104 and diffuses high pressure air in such a way as to reduce wind noise and turbulent airflow into an interior of the vehicle 102 than if the upper panel 400 and the mesh 600 were not in an extended position with the sunroof panel 106 in the same open or partially open position.

In another example, the upper panel 400 may be formed from an assembly of at least two components. In a combined state the components may be structurally and functionally similar to the example described above. The description that follows describes one portion of the upper panel 400 and one portion of the lower panel 500. Each portion of the upper panel 400 and the lower panel 500 may possess a respective matching second portion that is symmetrical to the first portion.

Figure 5A:
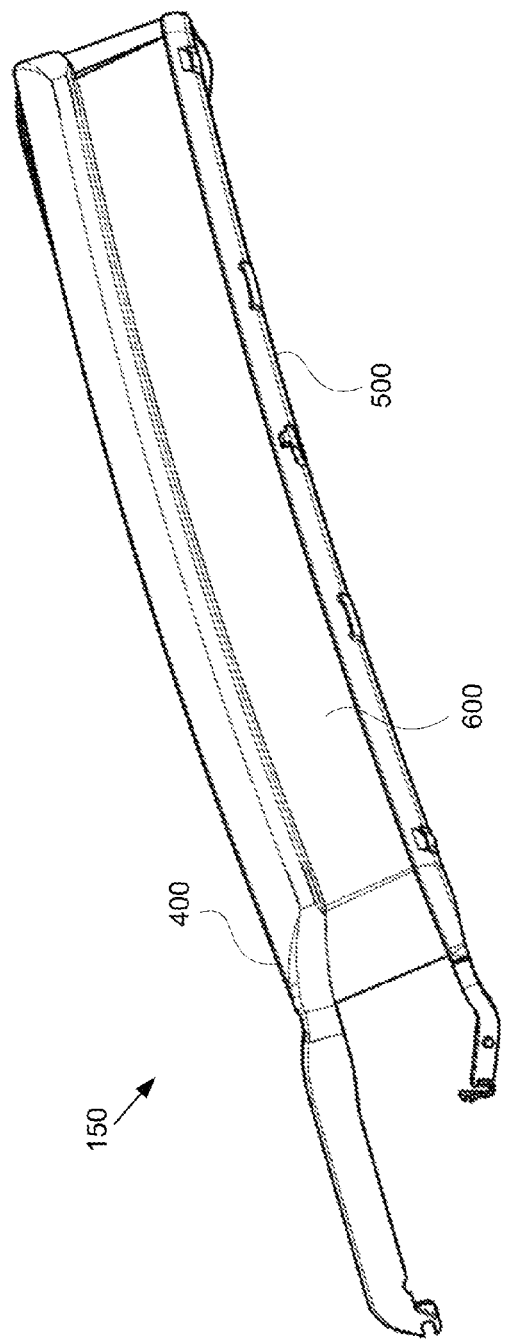
FIGS. 5A-5B illustrate a deflector assembly, according to one example.
Figure 5B:
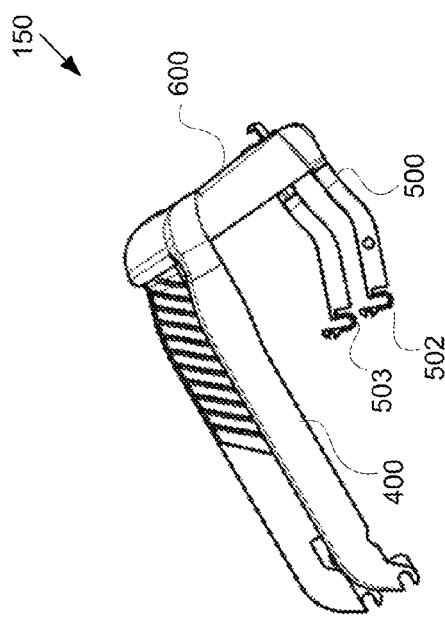

FIGS. 5A-5B illustrate the deflector assembly 150, according to one example. The deflector assembly 150 may include a mesh 600, a first edge of the mesh 600 may be connected to the upper panel 400, and a second edge of the mesh 600 may be connected to a lower panel 500. The mesh 600 may be connected to the upper panel 400 along a lateral edge (relative to the 102) of the upper panel 400 and the mesh 600 may be connected to the lower panel 500 along a lateral edge (relative to the 102) of the lower panel 500. Connections between the upper panel 400 and the mesh 600, and between the lower panel 500 and the mesh 600 may be formed by a process of overmolding where the upper panel 400 and the lower panel 500 may each be formed from a resin, for example, polypropylene, and the mesh 600 (which may be formed from a fabric) are all combined to form the deflector assembly 150.

The upper panel 400 and the lower panel 500 may be able to move freely relative to each other, limited by their connection to the mesh 600 or by connections to other components to which either the upper panel 400 and the lower panel 500 are attached. The mesh 600 becomes taut once the second end of the upper panel 400 and the second end of the lower panel 500 are sufficiently far apart such as in a case that the sunroof panel 106 is in an open or partially open position and the deflector assembly 150 is in an extended position. Conversely, in a case the sunroof panel 106 is closed then the deflector assembly 150 may also be in a closed state and the mesh 600 is folded. The deflector assembly 150 is designed to connect to the first rail 200 and second rail 201, the first holder 700 and second holder 701, and the front housing 300 such that in an open position of the sunroof panel 106, the deflector assembly 150 is in an extended position and the mesh 600 is pulled taut between the upper panel 400 and the lower panel 500 by a spring force of the torsion spring 128. In a closed position of the sunroof panel 106, the upper panel 400 and the lower panel 500 are compressed together and the mesh 600 is folded, as the torsion spring 128 is compressed by the position of the sunroof panel 106 over the upper panel 400.

The upper panel 400 may have a second, substantially symmetrical end connected to the second holder 701 in the same way, the upper panel 400 forming a "U" shape between the first and the second ends in a plan view.

The lower panel 500 may have a second, substantially symmetrical end, the lower panel 500 forming a "U" shape between the first and the second ends in a plan view. The mounting arm 502 may be connected to the first end of the lower panel 500, and a mounting arm 503 may be connected to the second end of the lower panel 500. The mounting arm 502 may be configured to connect to an end of the rail 200 such as by a snap fit, and the mounting arm 503 may be configured to connected to an end of the rail 201 such as by a snap fit. One or more molding interface 504 may be connected to an edge of the lower panel 500.

The mounting arm 502 includes a first guide surface 506, second guide surface 508, a U-shaped portion 510, and a recess 512. The first guide surface 506 and the second guide surface 508 are arranged on upper and lower ends of the arm 502. Each of the first guide surface 506 and second guide surface 508 have a chamfered or curved edge that allow for the location of the end of the rail 200. If the end of the rail 200 is below or above the mounting arm 502, the end of the rail 200 slides along the respective first guide surface 506 or second guide surface 508 before locating in the recess formed between the guide surfaces. The U-shaped portion 510 and recess 512 combine to form an elastic construction so that the mounting arm 502 is movable in a resilient manner upwards and downwards with reference to FIG. 4. The combination of the elastic deformation of the U-shaped portion 510 and the guide surfaces (506 and 508) ease the insertion of the mounting arm 502 on the end of the rail 200.

The edge of the lower panel 500 may be configured such that the number of molding interface 504 connect to a corresponding number of lower panel hook 302 of the front housing 300, allowing the lower panel 500 to be positioned in a stable manner within the vehicle 102. Each molding interface 504 may be undercut such that the molding interface 504 may easily hook to a corresponding lower panel hook 302 on the front housing 300 (FIG. 4).

In another example, the lower panel 500 may be formed from an assembly of at least two components. In a combined state the components may be structurally and functionally similar to the example described above.

FIGS. 6A-6D illustrate an assembly process of the sunroof wind deflector system 101, according to one example. In one implementation, the torsion spring 128 may be positioned on the arbor 704 of the holder 700 such that the torsion spring 128 may pivot about the arbor 704. The first end of the torsion spring 128 may be placed into the spring channel 712 of the holder 700. The second end of the torsion spring 128 may be positioned to project upwardly toward to support the upper panel 400. The upper panel 400 of the deflector assembly 150 may then be connected to the upper panel mount 706 of the holder 700. The upper panel 400 may then be lowered to make contact with the second end of the torsion spring 128 which provides a resistance force against a downward movement of the upper panel 400 as the deflector assembly 150 changes between an extended and a retracted position.

The upper panel 400 may be connected at an angle with the horizontal that is greater than an angle within an operating range of the upper panel 400 to help ensure retention of the upper panel 400 to the upper panel mount 706. The angle with the horizontal may be greater than about 45 degrees.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

What is claimed is:

1. A system to deflect an airflow of a sunroof opening of a vehicle, the system comprising:
   a sunroof panel slideably connected to the sunroof opening;
   a rail on a side of the sunroof opening;
   a holder fixed in the rail;
   a deflector assembly including an upper panel pivotally connected to the holder and a lower panel connected to the rail, wherein
   the sunroof panel covers and compresses the deflector assembly in a closed position and covers the sunroof opening, and the deflector assembly rotates and extends when the sunroof panel retracts to an at least a partially open position, and
   the holder includes a tab that is connected to a notched portion of the rail by an interference fit.

2. The system according to claim 1, wherein the deflector assembly includes:

a mesh including a first edge connected to an edge of the upper panel and including a second edge connected to the lower panel; and a torsion spring connected to the holder and the upper panel, wherein the torsion spring extends the upper panel above the sunroof panel when the sunroof panel retracts to an at least a partially open position.

3. The system according to claim 1, wherein the holder includes a leg connected to a channel of the rail.

4. The system according to claim 2, wherein the holder includes an upper panel mount, and an end of the upper panel includes a mount cutout that rotatably connects to the upper panel mount.

5. A system to deflect an airflow of a sunroof opening of a vehicle, the system comprising:

a sunroof panel slideably connected to the sunroof opening;

a rail on a side of the sunroof opening;

a holder fixed in the rail;

a deflector assembly including an upper panel pivotally connected to the holder and a lower panel connected to the rail; and a mounting arm disposed on an end of the lower panel, the mounting arm including a guide surface that connects to an end of the rail, wherein the sunroof panel covers and compresses the deflector assembly in a closed position and covers the sunroof opening, and the deflector assembly rotates and extends when the sunroof panel retracts to an at least a partially open position, and the mounting arm includes an elastic portion that allows relative motion between the guide surface and a portion of the lower panel between the mounting arm and the deflector assembly.

6. The system according to claim 2, further comprising:

a molding interface disposed along an edge of the lower panel and configured to contact a lower panel hook connected across an edge of a housing disposed adjacent to the sunroof opening.

7. The system according to claim 5, wherein the elastic portion includes a U-shaped portion extending from the guide surface and a recess adjacent to the U-shaped portion.

* * * * *